US011012482B1

(12) United States Patent
Yerli

(10) Patent No.: US 11,012,482 B1
(45) Date of Patent: May 18, 2021

(54) SPATIALLY AWARE MULTIMEDIA ROUTER SYSTEM AND METHOD

(71) Applicant: TMRW Foundation IP S. À R.L., Bettembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 17/005,767

(22) Filed: Aug. 28, 2020

(51) Int. Cl.
*H04L 29/06* (2006.01)
(52) U.S. Cl.
CPC ................... *H04L 65/403* (2013.01)
(58) Field of Classification Search
None
See application file for complete search history.

(56) References Cited

U.S. PATENT DOCUMENTS

| | | | |
|---|---|---|---|
| 8,032,799 B2 | 10/2011 | Hamilton, III et al. | |
| 9,755,966 B2 | 9/2017 | Butler et al. | |
| 10,346,378 B1 | 7/2019 | Jones | |
| 2007/0174429 A1 | 7/2007 | Mazzaferri et al. | |
| 2009/0254843 A1* | 10/2009 | Van Wie | G06F 3/04815 715/757 |
| 2013/0024756 A1* | 1/2013 | Basso | G06F 3/0484 715/202 |
| 2015/0092008 A1* | 4/2015 | Manley | H04L 65/403 348/14.07 |
| 2016/0210602 A1 | 7/2016 | Siddique et al. | |
| 2017/0024100 A1 | 1/2017 | Pieper | |
| 2017/0127023 A1 | 5/2017 | High | |
| 2018/0352303 A1* | 12/2018 | Siddique | H04L 65/1069 |
| 2019/0200049 A1 | 6/2019 | Yang et al. | |
| 2019/0319472 A1* | 10/2019 | Lebreux | B60L 50/64 |
| 2020/0065853 A1 | 2/2020 | Cvinar | |
| 2020/0099891 A1 | 3/2020 | Valli | |

(Continued)

FOREIGN PATENT DOCUMENTS

| | | | | |
|---|---|---|---|---|
| CN | 106027679 A | | 10/2016 | |
| EP | 2237200 A1 | * | 10/2010 | ............ G06Q 10/10 |
| WO | WO-2010063100 A1 | * | 6/2010 | ........... H04N 19/164 |

OTHER PUBLICATIONS

Eleftheriadis, A., "SVC and Video Communications: Scalable Video Coding Technology for Real-Time Multi-party Video," Vidyo, May 2016, 15 pages.

(Continued)

*Primary Examiner* — Jeffrey R Swearingen
(74) *Attorney, Agent, or Firm* — Christensen O'Connor Johnson Kindness PLLC

(57) ABSTRACT

A spatially-aware multimedia router system includes at least one media server computer configured to receive and analyze incoming data comprising incoming multimedia streams from client devices, and adapt outbound multimedia streams for individual client devices based on the incoming data received from the client devices. The incoming multimedia streams include elements from within a virtual environment. The outbound multimedia streams are adapted for the individual client devices based on user priority data and spatial orientation data that describes spatial relationships between corresponding user graphical representations and sources of the incoming multimedia streams within the virtual environment.

23 Claims, 8 Drawing Sheets

(56) References Cited

U.S. PATENT DOCUMENTS

2020/0166991 A1    5/2020   Aggarwal et al.
2020/0169694 A1    5/2020   Yang et al.

OTHER PUBLICATIONS

Office Action dated Dec. 24, 2020 issued in U.S. Appl. No. 17/006,327, filed Aug. 28, 2020, 31 pages.
Office Action dated Jan. 28, 2021 issued in U.S. Appl. No. 17/060,459, filed Oct. 1, 2020, 33 pages.
Office Action dated Feb. 4, 2021 issued in U.S. Appl. No. 17/060,623, filed Oct. 1, 2020, 36 pages.
Office Action dated Feb. 5, 2021 issued in U.S. Appl. No. 17/060,516, filed Oct. 1, 2020, 43 pages.
Office Action dated Feb. 4, 2021 issued in U.S. Appl. No. 17/060,555, filed Oct. 1, 2020, 41 pages.
Office Action dated Feb. 4, 2021 issued in U.S. Appl. No. 17/060,591, filed Oct. 1, 2020, 34 pages.
Office Action dated Feb. 8, 2021 issued in U.S. Appl. No. 17/060,485, filed Oct. 1, 2020, 28 pages.

\* cited by examiner

SPATIALLY AWARE MULTIMEDIA ROUTER SYSTEM AND METHOD

CROSS-REFERENCE TO RELATED APPLICATIONS

This application is related to co-pending U.S. patent application Ser. No. 17/006,327, filed concurrently herewith, entitled "System and Method Enabling Interactions in Virtual Environments with Virtual Presence," which is incorporated herein by reference.

FIELD

The current disclosure refers generally to computer systems, and more specifically to a multimedia router system and method.

BACKGROUND

Video conferencing enables remote communication between multiple users, and is becoming a relatively low cost and fast communication tool for people in a plurality of locations. Video conferencing has lately become popular due to a widespread deployment of broadband networks, advancements in video compression technologies, and increased availability of approaches for implementing web-based video communications with lower infrastructure requirements and at low costs.

For example, one such approach enabling video conferencing is a mesh (peer-to-peer) infrastructure, where each client device sends multi-media streams to all other client devices. This represents a low-cost solution that does not require any intermediate infrastructure, but results in a low scalability due to rapid bandwidth overload and limited processing capacity of the client devices.

Another example approach is a multipoint control unit (MCU), which, implemented in a central media server, receives all of the multimedia streams from the client devices decodes and combines all of the streams into one stream that is re-encoded and sent to all client devices, reducing latency and bandwidth problems relative to peer-to-peer models. However, MCU implementation tends to be complex and requires a high amount of computing resources from the media server.

Another example approach is a selective forwarding unit (SFU), which is used in the web real-time communication (WebRTC) video-conferencing standard. The WebRTC standard generally supports browser-to-browser applications such as voice calling, video chat, and peer-to-peer (P2P) file sharing applications, while avoiding the need for plugins to connect video communications endpoints. An SFU, which may be implemented in a central media server computer, comprises software programs configured to route video packets in video streams to multiple participant devices without performing intensive media processing (e.g., decoding and re-encoding) at the server. Thus, an SFU receives over a network all of the encoded media streams from client devices, and then selectively forwards the streams to the client devices of respective participants for subsequent decoding and display. The selectivity of the forwarding of SFU may be based on a plurality of parameters that may be used in an optimization of bandwidth associated with the forwarding of the multimedia streams, resulting in a higher Quality of Experience (QoE). For example, SFU may identify a speaking participant from the received multimedia streams, and may forward high-bit rate multimedia streams to listening participants; on the other hand, SFU may send low-bit rate multimedia streams of the listening participants to the other participants, achieving a certain degree of bandwidth and QoE improvement.

One limitation of typical video conferencing tools, such as through the approaches described above, is the limited scalability considering limitations in bandwidth and processing capacity of either of a central media or routing server or the participating client devices. Therefore, what is required are novel approaches that enable further optimizations of network bandwidth and computing resources during multimedia routing and forwarding operations while keeping a high QoE for relevant participants.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the current disclosure, a spatially-aware multimedia router system is provided. The spatially-aware multimedia router system comprises at least one media server computer comprising at least one processor and memory storing instructions implementing a data exchange management module managing data exchange between client devices. In an embodiment, the system further comprises one or more computing devices implementing at least one virtual environment connected to the at least one media server computer enabling access to one or more graphical representations of users (also referred to as user graphical representations) of the plurality of client devices. A plurality of multimedia streams (e.g., 2D video streams, 3D video streams, audio streams, or combination of such streams or other media streams) are generated from within the virtual environment taking into account virtual elements within the virtual environment and the input data from the at least one client device. Thus, the input data is received and combined within the virtual environment comprising a plurality of virtual elements and the at least one graphical representation of corresponding users of the client devices. The plurality of client devices are connected to the at least one media server computer via a network and are configured to send data comprising multimedia streams to the at least one media server computer.

The at least one media server is configured to receive and analyze incoming data comprising incoming multimedia streams from client devices, and adapt outbound multimedia streams for individual client devices based on the incoming data. The incoming multimedia streams include elements from within at least one virtual environment. The outbound multimedia streams are adapted for the individual client devices based on, e.g., user priority data and spatial orientation data that describes spatial relationships between, e.g., corresponding user graphical representations and sources of the incoming multimedia streams within the at least one virtual environment.

In an embodiment, the at least one media server computer performs data exchange management comprising analyzing and processing incoming data comprising multimedia streams from the client devices, and assessing and optimizing the forwarding of the outbound multimedia streams based on the incoming data received from the plurality of client devices including elements from within the at least one virtual environment. The incoming data is associated with user priority data and the spatial relationship between the corresponding user graphical representation and the incoming multimedia streams.

In some embodiments, the at least one virtual environment is hosted on at least one dedicated server computer connected via a network to the at least one media server computer. In other embodiments, the at least one virtual environment is hosted in a peer-to-peer infrastructure and is relayed through the at least one media server computer. The virtual environment may be used for hosting real-time video communications where users may interact with each other, and may be used for meetings, working, education, shopping, entertainment, and servicing, amongst others. In some embodiments, the virtual environment is a virtual replica of a real-world location, wherein the real-world location comprises a plurality of sensors providing further data to the virtual replica of the real-world location.

In some embodiments, the at least one media server computer uses a routing topology. In other embodiments, the at least one media server computer uses a media processing topology. In other embodiments, the at least one media server computer uses a forwarding server topology. In other embodiments, the at least one media server computer uses other suitable multimedia server routing topologies, or a media processing and forwarding server topology, or other suitable server topologies.

In an embodiment where the at least one media server computer uses a routing topology, the at least one media server computer uses a selective forwarding unit (SFU) topology, or a Traversal Using Relay NAT (TURN) a spatially analyzed media server topology (SAMS), or some other multimedia server routing topology.

In an embodiment where the at least one media server computer uses a media processing topology, the at least one media server computer is configured to perform one or more operations on the incoming data comprising compressing, encrypting, re-encrypting, decrypting, decoding, combining, improving, mixing, enhancing, augmenting, computing, manipulating, or encoding, or a combination thereof. In a further embodiment, combining the incoming data is performed in the form of a mosaic comprising separate tiles where the individual multimedia streams of user graphical representations are streamed.

In an embodiment where the at least one media server computer uses a forwarding sever topology, the at least one media server computer is configured as a multipoint control unit (MCU), or a cloud media mixer, or a cloud 3D renderer.

In an embodiment of the at least one media server computer being configured as a SAMS, the at least one media server computer is configured to analyze and process the incoming data of each client device related to user priority and spatial relationships (e.g., the spatial relationships between the corresponding user graphical representation and the sources of incoming multimedia streams). In such an embodiment, the at least one media server computer may be further configured to determine user priority and/or spatial relationships based on such data. The incoming data comprises, in certain embodiments, one or more of the following: meta-data, priority data, data classes, spatial structure data, scene graphs, three-dimensional positional, orientation or locomotion information, speaker or listener status data, availability status data, image data, or scalable video codec-based video, or a combination thereof. In further embodiments, adapting the outbound multimedia streams (e.g., as implemented by the at least one media server computer implementing a SAMS) comprises optimizing bandwidth and computing resource utilization for the one or more receiving client devices. The adapting of the outbound multimedia streams also may include adapting temporal features, spatial features, quality, or color features, or a combination thereof. In yet further embodiments, the SAMS optimizes the forwarding of the outbound data streams to each receiving client device by modifying, upscaling or downscaling the media for temporal features, spatial features, quality, and color features.

In another aspect of the current disclosure, a spatially-aware multimedia router method is provided. The spatially-aware multimedia router method comprises providing, in memory of at least one media server computer, data and instructions implementing a client devices data exchange management module managing data exchange between a plurality of client devices. The method proceeds by receiving, by at least one media server computer, incoming data comprising incoming multimedia streams from the plurality of client devices, wherein the incoming data is associated with user priority data and spatial orientation data. For example, the spatial orientation data may describe, e.g., the spatial relationships between corresponding user graphical representations and one or more sources of the incoming multimedia streams. Subsequently, the method continues by performing, by the data exchange management module, data exchange management. In an embodiment, the data exchange management comprises analyzing and/or processing the incoming data from the plurality of client devices including graphical elements from within the virtual environment; and adapting the outbound multimedia streams based on the incoming data received from the plurality of client devices. The method ends by forwarding the adapted outbound multimedia streams to one or more receiving client devices, wherein the adapted outbound multimedia streams are configured to be displayed (e.g., to users represented with user graphical representations) at the receiving client device(s).

In some embodiments, the method further comprises, when forwarding the outbound multimedia streams, utilizing a routing topology, or a media processing topology, or a forwarding server topology, or other suitable multimedia server routing topologies, or a media processing and forwarding server topology, or other suitable server topologies.

In some embodiments, in a routing topology, the at least one media server computer uses a selective forwarding unit (SFU) topology, a Traversal Using Relay NAT (TURN) a spatially analyzed media server topology (SAMS), or another multimedia server routing topology.

In some embodiments, in a media processing topology, the at least one media server computer is configured to perform one or more media processing operations on the incoming data comprising compressing, encrypting, re-encrypting, decrypting, decoding, combining, improving, mixing, enhancing, augmenting, computing, manipulating, or encoding, or a combination thereof.

In some embodiments, the method further comprises, when utilizing a forwarding server topology, utilizing one or more of Multipoint Control Units (MCUs), cloud media mixers, and cloud 3D renderers.

In some embodiments, using a SAMS configuration, the method further comprises analyzing and processing the incoming data of each client device related to user priority and spatial relationships (e.g., the distance relationships or other spatial relationships between the corresponding user graphical representation and the sources of incoming multimedia streams). In such an embodiment, the method may further include determining user priority and/or spatial relationships based on such data. The incoming data comprises one or more of the following: meta-data, priority data, data classes, spatial structure data, scene graphs, three-dimensional positional, orientation or locomotion information, speaker or listener status data, availability status data, image data, and scalable video codec-based video, or a combination thereof.

In some embodiments, adapting the outbound multimedia streams (e.g., as implemented by the at least one media server computer implementing a SAMS) comprises optimizing bandwidth and computing resource utilization for the one or more receiving client devices. The adapting of the outbound multimedia streams also may include adapting temporal features, spatial features, quality, or color features, or a combination thereof. In further embodiments, the SAMS optimizes the forwarding of the outbound data streams to each receiving client device by modifying, upscaling or downscaling the media for temporal features, spatial features, quality, and color features.

In another aspect of the current disclosure, computer readable media have instructions stored thereon, which are configured to cause one or more computing devices to perform any of the techniques described herein. In an embodiment, at least one computer readable medium has stored thereon instructions configured to cause at least one media server computer comprising a processor and memory to perform steps comprising receiving, by at least one media server computer, incoming data comprising incoming multimedia streams from a plurality of client devices, wherein the incoming data is associated with spatial orientation data that describes spatial relationships between one or more user graphical representations and at least one element of at least one virtual environment; analyzing the incoming data from the plurality of client devices; adapting the outbound multimedia streams based on the incoming data received from the plurality of client devices; and forwarding the adapted outbound multimedia streams to receiving client devices, wherein the adapted outbound multimedia streams are configured to be displayed at the receiving client devices.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure provides a spatially-aware multimedia router system and method configured to receive input data from a plurality of client devices, and implement data exchange management on the input data. The input data is received and combined within a virtual environment comprising a plurality of virtual elements and at least one graphical representation of corresponding users of the client devices. The virtual environment may be used for hosting real-time video communications where users may interact with each other, and may be used for meetings, working, education, shopping, entertainment, and servicing, amongst others. The data exchange management comprises analyzing and processing incoming data comprising at least multimedia streams (e.g., 2D video streams, 3D video streams, audio streams, or combinations of such streams or other media streams) from the client devices, and assessing and optimizing the forwarding of the outbound multimedia streams based on the incoming data received from the plurality of client devices including elements from within the at least one virtual environment. The incoming data is associated to user priority data and the spatial relationship between the corresponding user graphical representation and the incoming multimedia streams. Therefore, the system and method of the current disclosure enables the routing of the multimedia streams that are received by the client devices to take place within a virtual environment while simultaneously optimizing the input data and the forwarding of the outbound multimedia streams so that an optimal selection of the receiving client devices is performed, enabling at the same time efficiencies in bandwidth and computing resources. These efficiencies can make the spatially-aware multimedia router system and method of the current disclosure a viable and effective option for processing of multi-user video conferencing comprising large numbers (e.g., hundreds or thousands) of users accessing a virtual environment.

Figure 1:
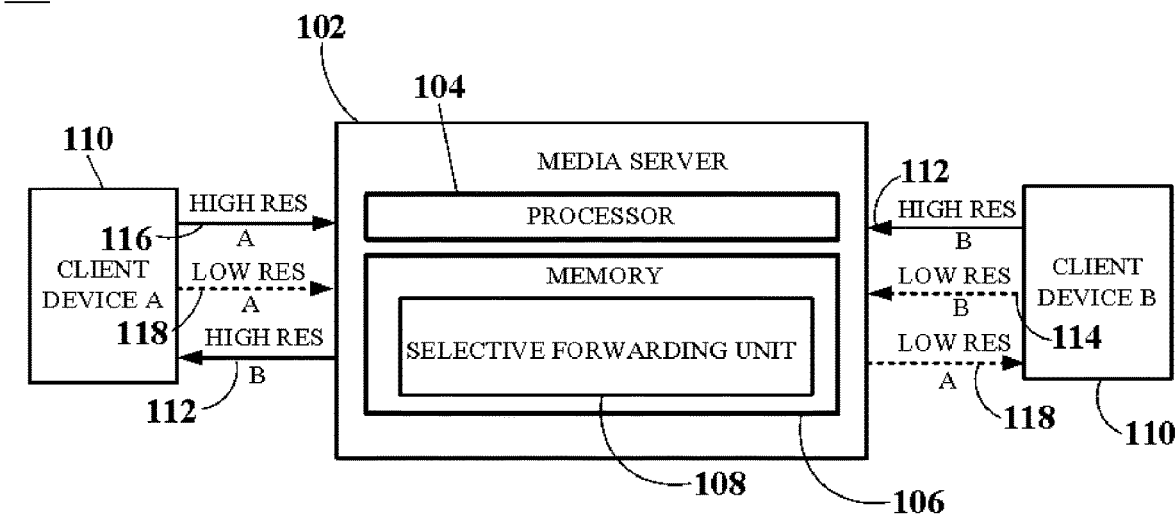
FIG. 1 shows a schematic representation of a conventional selective forwarding unit (SFU) routing topology.

FIG. 1 shows a schematic representation of a conventional selective forwarding unit (SFU) routing topology 100.

The example conventional SFU routing topology 100 comprises at least one media server computer 102 with at least one processor 104 and memory 106 storing computer programs implementing an SFU 108 for providing video forwarding in real-time video applications. A plurality of client devices 110 may communicate in real-time through the SFU 108, wherein the SFU 108 forwards outbound media streams including real-time transport protocol (RTP) video packets to the client devices 110 based on one or more parameters. For example, a client device B may represent a current speaker during a real-time communication with client device A. Client device B sends two or more media streams to the client device A, wherein, for example, one media stream is sent at high resolution (B) 112 and one media stream at low resolution (B) 114. Further in this example, client device A may also send two or media streams to client device B, such as one media stream at high resolution (A) 116 and one media stream at low resolution (A) 118. Client device B may receive the low resolution (A) 118 media stream from client device A, as client device A may be used by a passive user that is only listening at that moment to the user of client device B. Client device A, on the other hand, may receive the high resolution (B) 112 media stream from client device B, as the user of client device B may be an active user currently speaking. The at least one media server computer 102 and two or more client devices 110 may connect through a network, such as one or more wired or wireless communication networks (e.g., local area network (LAN), wide area network (WAN), the Internet, paths, links, and any intermediary nodes network hardware such as routers, gateways, firewalls, switches, and the like). The video applications may utilize, for example, the WebRTC standard for implementing multi-party video conferencing applications.

The SFU routing topology 100 may include limitations, such as having to forward each media stream to of each client device 110 regardless of the status of the client device 110; not enabling media modifications, such as data operations on the media streams (e.g., augmenting, enhancing, combining, etc.); and considering limited parameters to prioritize and optimize the outbound media streams, resulting in a suboptimal network bandwidth and resources optimization for the system, ultimately limiting the number of users that can interact and view the multimedia streams simultaneously. Finally, the conventional SFU routing topology 100 is not optimum for enabling video communications and interactions, such as social interactions, in virtual environments.

Figure 2:
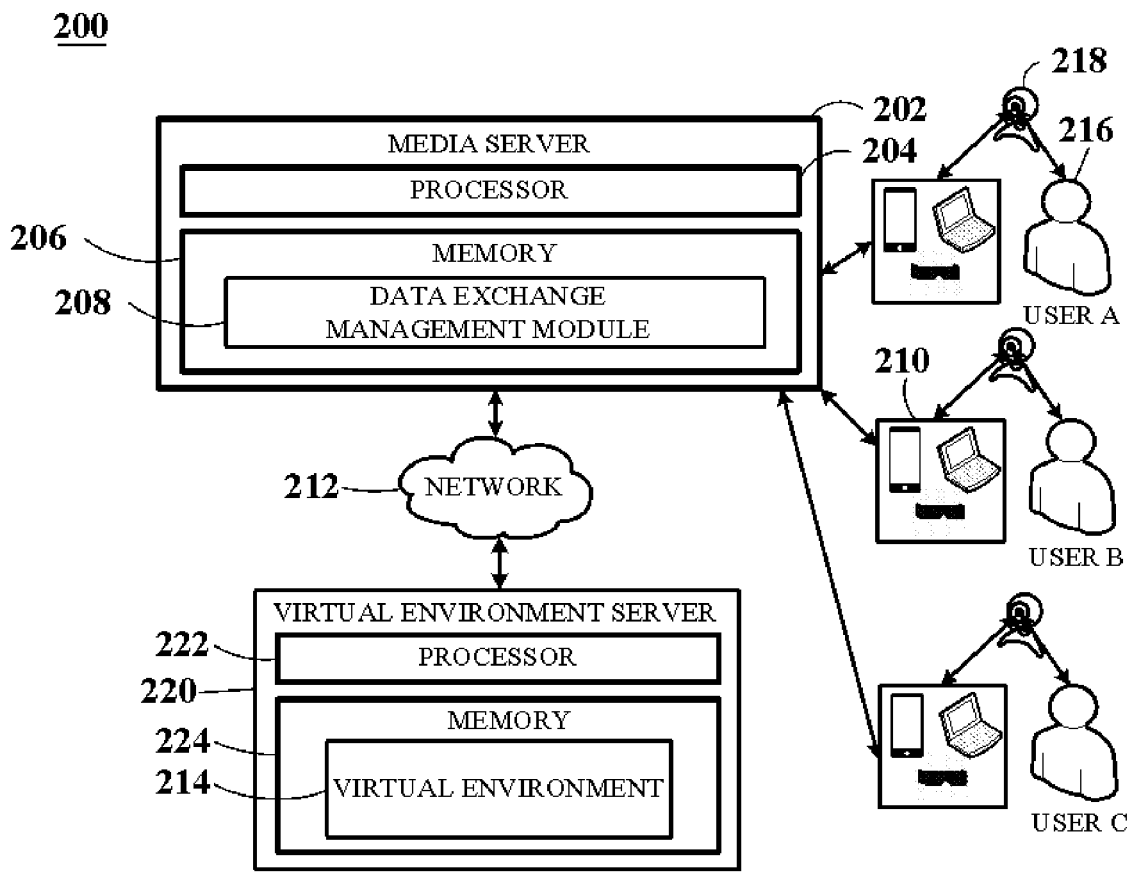
FIG. 2 shows a schematic representation of a spatially-aware multimedia router system, according to an embodiment.

FIG. 2 shows a schematic representation of a spatially-aware multimedia router system 200, according to an embodiment.

The spatially-aware multimedia router system 200 comprises at least one media server computer 202 comprising at least one processor 204 and memory 206 storing instructions implementing a data exchange management module 208 managing data exchange between client devices 210 connected to the at least one media server computer 202 via a network 212. The spatially-aware multimedia router system 200 may further comprise at least one virtual environment server 220 connected to the at least one media server computer 202 enabling access to one or more user graphical representations of users 216 of the plurality of client devices 210 in a virtual environment 214. A plurality of multimedia streams are generated from within the virtual environment 214 comprising multimedia streams obtained by cameras 218 obtaining live feed data from the one or more users 216 and graphical elements from within the virtual environment.

The at least one media server computer 202 is a server computing device comprising resources (e.g., the at least one processor 204 and memory 206 along with network access capabilities) for performing techniques disclosed herein, such as storing, processing, routing and forwarding the input data received from the plurality of client devices 210. The at least one media server computer 202 performs client devices data exchange management through the data exchange management module 208, comprising analyzing and processing incoming data comprising the multimedia streams from the client devices 210 including graphical elements from within the virtual environment 214, and adapting outbound multimedia streams. In an embodiment, this includes assessing and optimizing the forwarding of the outbound multimedia streams based on the incoming data received from the plurality of client devices 210. The outbound multimedia streams are adapted for the individual client devices based on the incoming data, e.g., user priority data and spatial orientation data that describes spatial relationships between, e.g., corresponding user graphical representations and sources of the incoming multimedia streams within the at least one virtual environment. In an embodiment, the incoming data is associated with the spatial relationship between the one or more user graphical representations and at least one element of the at least one virtual environment 214.

The at least one virtual environment 214 is, in some embodiments, a virtual replica of a real-world location. The real-world location may comprise a plurality of sensors providing real-world data to the virtual replica of the real-world location through the virtual environment 214. The sensors may send the captured data to the virtual environment server 220 through the network 212, which may be utilized by the at least one media server 202 to update, enrich and synchronize corresponding virtual replicas of the real-world elements in the at least one virtual environment. Furthermore, the one or more media servers 202 may be further configured to merge the real-world data captured by the sensors and the virtual data in the virtual environment 214 into the virtual environment 214 in order to augment the real-world data with the virtual data.

In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices. The further real-world data may comprise, for example, video data, temperature data, real-time energy consumption data, real-time water consumption data, speed or acceleration data, or the like.

In one embodiment, the at least one virtual environment 214 is hosted on at least one virtual environment server computer 220 comprising at least one processor 222 and memory 224 implementing the virtual environment 214. In another embodiment, the at least one virtual environment 214 is hosted in a peer-to-peer (P2P) infrastructure and is relayed through the at least one media server computer 202 to the plurality of client devices 210.

The arrangement of the at least one virtual environment 214 may be associated to one or more themes, such as for meetings (e.g., as a virtual conference room), working (e.g., as a virtual office space), education (e.g., as a virtual classroom), shopping (e.g., as a virtual shop), entertainment (e.g., karaokes, event halls or arenas, theaters, nightclubs, sports fields or stadiums, museums, cruise ships, video games, etc.) and servicing (e.g., hotels, tour agencies, or restaurant bookings or ordering, government agency services, etc.). A combination of virtual environments 214 from the same and/or different themes may form a virtual environment cluster, which may comprise hundreds or even thousands of virtual environments (e.g., a plurality of virtual classrooms may be part of a virtual school). The virtual environment 214 may be a 2D or 3D virtual environment comprising a physical arrangement and visual appearance associated to the theme of the virtual environment 214, which may be customized by the users depending on their preferences or needs. The users may access the virtual environment 214 through a graphical representation that may be inserted into the virtual environment 214 and graphically combined with the two-or-three dimensional virtual environment 214.

Each of the virtual environments 214 may be provided corresponding resources (e.g., memory, network and computing power) by the at least one virtual environment server computer 220 or P2P infrastructure. The at least one virtual environment 214 may be accessed by one or more users 216 through a graphical user interface via a client device 210. The graphical user interface may be comprised in a downloadable client application or a web browser application, using, for example, a WebRTC standard, providing the application data and instructions required to execute the selected virtual environment 214 and therein enable a plurality of interactions. Furthermore, each of the virtual environments 214 may include one or more human or artificial intelligence (AI) hosts or assistants that may assist users within the virtual environment 214 by providing required data and/or services through their corresponding user graphical representation. For example, a human or AI bank service clerk may assist a user of a virtual bank by providing required information in the form of presentations, forms, lists, etc., as required by the user.

In some embodiments, the user graphical representation is a user 3D virtual cutout, which may be constructed from one or more input images, such as a user-uploaded or third-party-source photo with a removed background; or a user real-time 3D virtual cutout with a removed background, which may be generated based on input data such as real-time 2D, stereo, or depth image or video data, or 3D video data in a live video stream data feed obtained from the camera, comprising a real-time video stream of the user, or a video without removed background, or a video with removed background. In some embodiments, the user graphical representation may be rendered and displayed utilizing a polygonal structure. Such polygonal structures can be a quad structure or more complex 3D structures used as a virtual frame to support the video. In yet other embodiments one or more of the user graphical representations are inserted into three dimensional coordinates within a virtual environment 214 and are therein graphically combined.

In the current disclosure, the term "user 3D virtual cutout" refers to a virtual replica of a user constructed from a user-uploaded or third-party-source 2D photo. The user 3D virtual cutout is created via a 3D virtual reconstruction process through machine vision techniques using the user-uploaded or third-party-source 2D photo as input data, generating a 3D mesh or 3D point cloud of the user with removed background. In the current disclosure, the term "user real-time 3D virtual cutout" refers to a virtual replica of a user based on the real-time 2D or 3D live video stream data feed obtained from the camera and after having the user background removed. The user real-time 3D virtual cutout is created via a 3D virtual reconstruction process through machine vision techniques using the user live data feed as input data by generating a 3D mesh or 3D point cloud of the user with removed background. In the current disclosure, the term "video with removed background" refers to a video streamed to a client device, wherein a background removal process has been performed on the video so that only the user may be visible and then displayed utilizing a polygonal structure on the receiving client device. In the current disclosure, the term "video without removed background" refers to a video streamed to a client device, wherein the video is faithfully representing the camera capture, so that the user and his or her background are visible and then displayed utilizing a polygonal structure on the receiving client device.

The P2P infrastructure may use a suitable P2P communication protocol enabling real-time communication between client devices 210 in the virtual environment 214 through suitable application programming interfaces (APIs), enabling real-time interactions and synchronizations thereof. An example of a suitable P2P communication protocol may be a WebRTC communication protocol, which is collection of standards, protocols, and JavaScript APIs, which, in combination, enable P2P audio, video, and data sharing between peer client devices 210. Client devices 210 using the P2P infrastructure may perform real-time 3D rendering of the live session employing, for example, one or more rendering engines. Exemplary rendering engines may be 3D engines based on WebGL, which is a JavaScript API for rendering 2D and 3D graphics within any compatible web browser without the use of plug-ins, allowing accelerated usage of physics and image processing and effects by one or more processors of the at least one client device 210 (e.g., one or more graphic processing units (GPUs)). Furthermore, client devices 210 using the P2P infrastructure may perform image and video-processing and machine-learning computer vision techniques through one or more suitable computer vision libraries. An example of a suitable computer vision library may be OpenCV, which is a library of programming functions configured mainly for real-time computer vision tasks.

In some embodiments, the at least one media server computer 202 uses a routing topology. In another embodiment, the at least one media server computer 202 uses a media processing topology. In another embodiment, the at least one media server computer 202 uses a forwarding server topology. In another embodiment, the at least one media server computer 202 uses other suitable multimedia server routing topologies, or a media processing and forwarding server topology, or other suitable server topologies. The topology used by the at least one media server computer 202 may depend on the processing capacities of the client devices and/or of the at least one media server computer, as well as the capacities of the network infrastructure being utilized.

In some embodiments, in a media processing topology, the at least one media server computer 202 is configured to perform one or more media processing operations on the incoming data comprising compressing, encrypting, re-encrypting, decrypting, decoding, combining, improving, mixing, enhancing, augmenting, computing, manipulating, encoding, or a combination thereof. Thus, the at least one media server computer 202, in a media processing topology, is not only configured to route and forward the incoming data, but also to perform a plurality of media processing operations that may enhance or otherwise modify the outbound multimedia streams to client devices 210.

In some embodiments, in a forwarding server topology, the at least one media server computer 202 is configured as a multipoint control unit (MCU), or a cloud media mixer, or a cloud 3D renderer. As an MCU, the at least one media server computer 202 is configured to receive all of the multimedia streams from the client devices and decode and combines all of the streams into one stream that is re-encoded and sent to all client devices 210. As a cloud media mixer the at least one media server computer 202 is configured to choose between different multimedia sources (e.g., audio and video), such as from the various client devices 210 and the at least one virtual environment 214, and to mix the input data multimedia streams along with adding footage and/or special effects in order to create the processed output multimedia streams for the client devices 210. Visual effects may range from, for example, simple mixes and wipes to elaborate effects. As a cloud 3D renderer, the at least one media server computer 202 is configured to calculate 3D scenes from the virtual environment through a large number of computer calculations to generate the final animated multimedia streams that are sent back to the client devices 210.

In a routing topology, the at least one media server computer 202 is configured to decide where (e.g., which of the one or more of the client devices 210) to send the multimedia streams, which may be performed through an Internet Protocol (IP) routing table to choose an interface that is the best route. Such a routing decision in the routing tables may be based on rules stored in the data exchange management module 208 considering the priority data and the spatial relationship between the corresponding user graphical representation and the incoming multimedia streams, so that an optimal selection of the receiving client devices 210 is performed. In some embodiments, as a routing topology, the at least one media server computer uses a selective forwarding unit (SFU) topology, or a Traversal Using Relay NAT (TURN) topology, or a spatially analyzed media server topology (SAMS), or some other multimedia server routing topology.

The SFU, as explained with reference to FIG. 1, is used in the WebRTC video-conferencing standard, which generally supports browser-to-browser applications such as voice calling, video chat, and P2P file sharing applications, while avoiding the need for plugins to connect video communications endpoints. SFU comprises software programs configured to route and forward video packets in video streams to multiple participant devices without performing intensive media processing operations such as decoding and re-encoding, receiving all of the encoded media streams from client devices, and then selectively forwarding the streams to the respective participants for decoding and presentation.

The TURN topology, which may be suitable in situations where the at least one media server computer 202 cannot establish a connection between the client devices 210, is an extension of Session Traversal Utilities for NAT (STUN), wherein NAT stands for Network Address Translation. NAT is a method of remapping an Internet Protocol (IP) address space into another by modifying network address information in the IP header of packets while they are in transit across a traffic routing device. Thus, NAT can give private IP addresses access to a network such as the Internet, and allows single devices, such as routing devices, to act as an agent between the Internet and a private network. NAT can be symmetric or asymmetric. A framework called Interactive Connectivity Establishment (ICE), which is configured to find the best path to connect client devices, may determine whether symmetric or asymmetric NAT may be required. Symmetric NAT not only does the job of translating the IP address from private to public, and vice-versa, but also translates ports. Asymmetric NAT, on the other hand, uses STUN servers to allow clients to discover their public IP address and the type of NAT they are behind, which may be used to establish a connection. In many cases, STUN may be used only during the connection setup and once that session has been established, data may start flowing between client devices. TURN may be used in the case of symmetric NAT, and may remain in the media path after the connection has been established while the processed and/or unprocessed data is being relayed between client devices.

Figure 3:
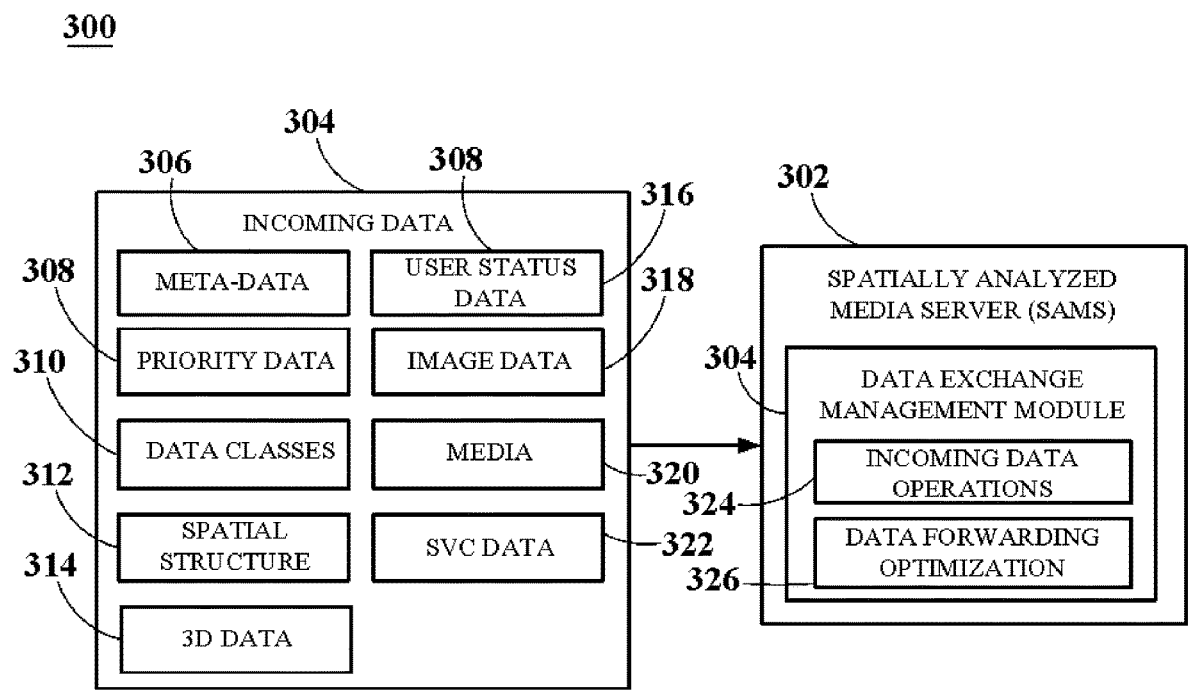
FIG. 3 shows a schematic representation of a system comprising at least one media server computer configured as a SAMS, according to an embodiment

FIG. 3 shows a schematic representation of a system 300 comprising at least one media server computer configured as a SAMS 302, according to an embodiment. Some elements of FIG. 3 may refer to similar elements than FIG. 2, and thus may use the same reference numerals.

The SAMS 302 is configured to analyze and process incoming data 304 of each client device. The incoming data 304 may, in some embodiments, be related to user priority and the distance relationship between the corresponding user graphical representation in the virtual environment and the multimedia streams. The incoming data 302 comprises one or more of meta-data 306, priority data 308, data classes 310, spatial structure data 312, scene graphs (not shown), three-dimensional data 314 comprising positional, orientation or locomotion data, user availability status data (e.g., active or passive status) 316, image data 318, media 320, and scalable video codec (SVC)-based video data 322, or a combination thereof. The SVC-based video data 322 may enable sending the data, by the client devices, comprising different resolutions without the need to send two or more streams, each stream per resolution.

The incoming data 304 is sent by the client devices, which, in the context of an application being run by the client devices that is executed in the virtual environment, generates the incoming data 304 that is used by SAMS 302 to perform incoming data operations 324 and data forwarding optimization 326. Thus, the SAMS 302 may not need to store information about the virtual environment, the distance relationships between user graphical representations, availability statuses, etc., as the data is already included in the incoming data sent by the client devices in regard to the application being run in the virtual environment, generating processing efficiencies for the SAMS 302. These efficiencies can make the SAMS 302 a viable and effective option for processing of multi-user video conferencing comprising large numbers (e.g., hundreds or thousands) of users accessing a virtual environment, as the SAMS 302 may concentrate its resources only on the data operations, routing and forwarding optimizations before sending the multi-media streams to the client devices. Alternatively, the incoming data 304 may include pre-processed spatial forwarding guidance, in which data forwarding calculations have already been performed. In this situation, the SAMS 302 may simply use this guidance to send multimedia streams to the client devices without performing additional calculations.

In some embodiments, the incoming data operations 326 implemented by the at least one media server computer implementing the SAMS may comprise compressing, encrypting, re-encrypting, decrypting, improving, mixing, enhancing, augmenting, computing, manipulating, encoding, or a combination thereof on the incoming data. These incoming data operations 326 may be performed per client instance depending on the priority and spatial relationships (e.g., distance relationships) of the user graphical representations with the multimedia stream's source and the remaining user graphical representations.

In some embodiments, the data forwarding optimization 326 implemented by the at least one media server computer implementing the SAMS comprises optimizing bandwidth and computing resource utilization for the one or more receiving client devices. In further embodiments the SAMS optimizes the forwarding of the outbound data streams to each receiving client device by modifying, upscaling or downscaling the media for temporal features, spatial features, quality, and color features. Such modifying, upscaling or downscaling of the incoming data for temporal features may comprise, for example, varying the frame rate; the spatial features may refer to, for example, image size; the quality refers to, for example, different compression or encoding based qualities; and the color refers to, for example, color resolution and range. These operations are performed based on the specific receiving client device user's spatial, three dimensional orientation, distance and priority relationship to such incoming data, and may contribute to the optimization of the bandwidth and computing resources.

The priority data is associated to, for example, the speaker or listener status data, wherein the one or more multimedia streams from a speaker have a higher priority score than the multimedia streams of a listener. The spatial relationship comprises associating a direct correlation between the distance and orientation of a user graphical representation with respect to a virtual multimedia stream's source and the remaining user graphical representations. Thus, the spatial relationship associates providing higher resolution or more enhanced multimedia streams to user graphical representations closer to and facing a virtual multimedia stream's source and lower resolution or less enhanced multimedia streams to user graphical representations farther from and partially facing or not facing the multimedia stream's source. Any combinations in-between may also apply, such as user graphical representations partially facing the multimedia stream's source at any degree of face and head orientation and any distance from the multimedia stream's source, having a direct effect in the quality of the multimedia stream received by the user.

The multimedia stream's source may be, for example, a user speaking in a virtual video-conference taking place within the virtual environment, a panel of speakers engaging in a debate or conference within the virtual environment, a webinar, an entertainment event, a show, etc., wherein at least one user is a speaker. In an example of a user speaking (e.g., giving a speech, webinar, conference, etc.), a plurality of users may be located within the virtual environment listening to the speaker. Some of the users may face, partially face, or not face the speaker, affecting the priority for each user and thus the quality of the multimedia streams received. However, in other embodiments, the multimedia streams may not come from other user graphical representations, but rather from other multimedia sources, such as virtual animations, augmented reality virtual objects, pre-recorded or live videos from events or places, application graphical representations, video games, etc., wherein the data operations are performed based on the specific receiving client device user's spatial, three dimensional orientation, distance and priority relationship to such multimedia streams.

Figure 4A:
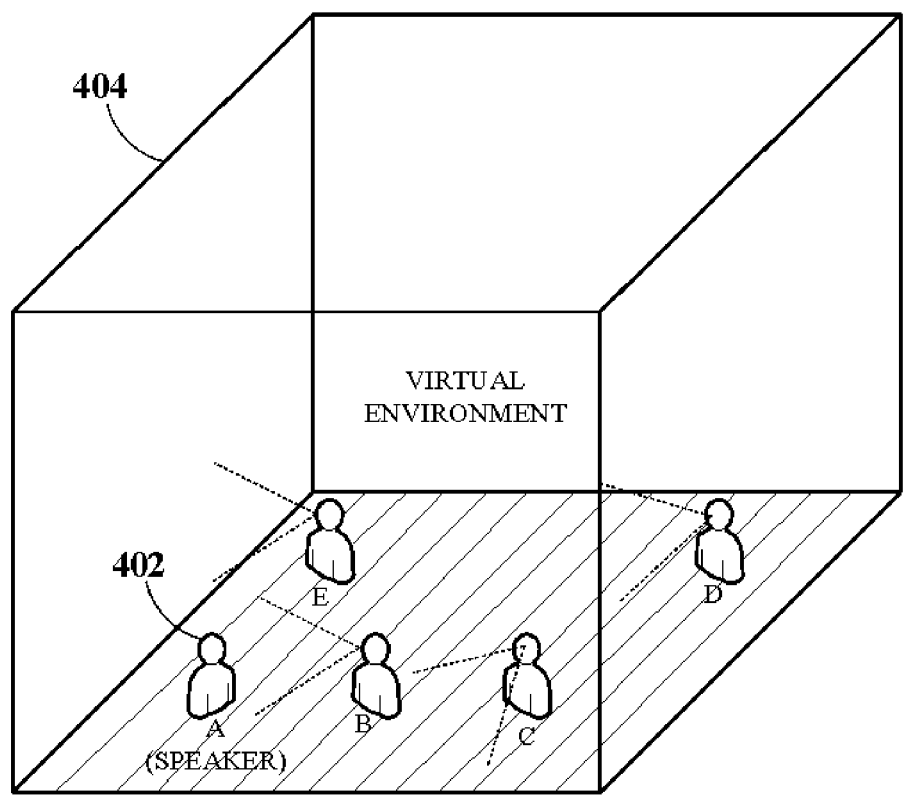
FIG. 4A shows a schematic representation of a virtual environment.

FIG. 4A shows a schematic representation of a virtual environment 400 in which a SAMS topology of the current disclosure may be employed, according to an embodiment.

The virtual environment 400 comprises five user graphical representations 402, namely user graphical representations A-E, wherein user graphical representation A represents a speaker and user graphical representations B-E represent four listeners, each located in a different 3D coordinate position of the virtual environment 400 and having a different face and head orientation along with a different point of view (PoV). Each user graphical representation 402 is associated with a corresponding user that is interacting in the virtual environment 404 through a client device connected to the virtual environment 404 and to at least one media server computer using a SAMS topology of the current disclosure, such as the SAMS 302 disclosed with reference to FIG. 3.

While user graphical representation A is speaking, user graphical representations B-E may be facing each at their individual orientations (e.g., the same or different orientations) and corresponding PoVs, along with different 3D coordinates. For example, user graphical representation B is located closest to user graphical representation A and is looking directly at user graphical representation A; user graphical representation C is located slightly farther away than user graphical representation B and is looking partially in the direction of user graphical representation A; user graphical representation D is located the farthest away from user graphical representation A may be looking partially in the direction of user graphical representation A; and user graphical representation E is as close to user graphical representation A as user graphical representation B but may be looking in a direction different than user graphical representation A.

Accordingly, the SAMS captures the incoming data from each of the five user graphical representations, performs input data operations and data forwarding optimizations, and selectively sends the resulting multimedia streams to the five client devices. Thus, each client device sends their own input data and receive correspondingly one or more multimedia streams (e.g., the four multimedia streams, one of each other user graphical representation in FIG. 4A), wherein each received multimedia stream is individually adapted (e.g., managed and optimized) for the corresponding user graphical representation based on the specific receiving client device user's spatial, three dimensional orientation, distance and priority relationship to such incoming data to achieve optimal bandwidth and computing resources.

Figure 4B:
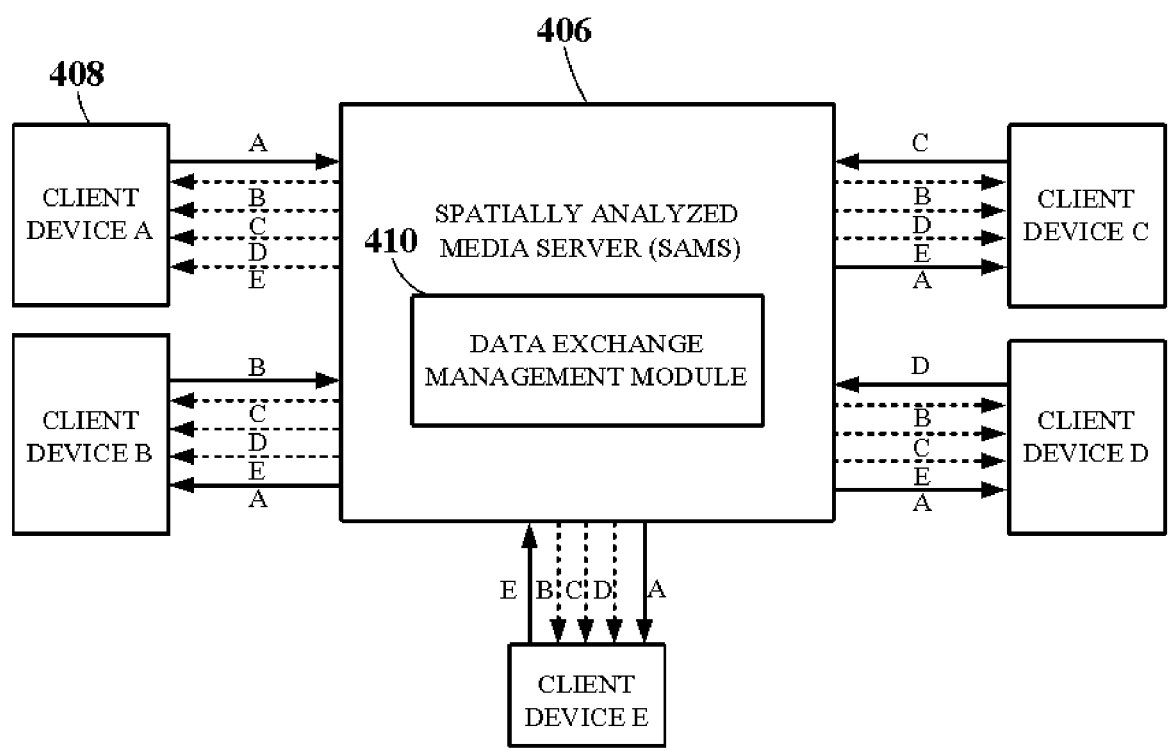
FIG. 4B shows a schematic representation of the forwarding of outbound media streams from a speaking user within the virtual environment employing a SAMS topology of the current disclosure, according to an embodiment.

FIG. 4B shows a schematic representation of the forwarding of adapted outbound media streams from the five user graphical representations the virtual environment 404 of FIG. 4A employing a SAMS 406 topology of the current disclosure, according to an embodiment. The SAMS 406 may analyze and optimize incoming data comprising the multimedia streams from the client devices 408 corresponding to the user graphical representations of FIG. 4A, and assess and optimize the forwarding of the outbound multimedia streams based on the incoming data received from the plurality of client devices 408 including elements from within the at least one virtual environment 404 of FIG. 4A. Said data operations and optimizations may be performed by the data exchange management module 410 of SAMS 406.

Each client device 408 sends their own input data to the SAMS 402 and receives correspondingly the four multimedia streams of the other client devices 408. Thus, client device A, because it is being used by a speaker, sends the incoming media streams with high priority data to the SAMS 402, and receives four lower priority multimedia streams B-E from the corresponding four client devices 408.

As user graphical representation B is located closest to user graphical representation A and is looking directly at user graphical representation A, client device B receives the multimedia streams from client A at the highest resolution when compared to the remaining users, receives the remaining multimedia streams C-E, each at their own resolution based on the spatial relationship with user graphical representations C-E, and sends his or her own corresponding multimedia stream B.

Client device C, because the user graphical representation C is located slightly farther away than user graphical representation B and is looking partially in the direction of user graphical representation A, receives the third highest resolution from client device A, receives the remaining multimedia streams B-E, each at their own resolution based on the spatial relationship with user graphical representations B-E, and sends his or her own corresponding multimedia stream C.

Client device D, since the corresponding user graphical representation D is located the farthest away from user graphical representation A and is looking partially in the direction of user graphical representation A, receives the lowest resolution from client device A, receives the remaining multimedia streams B, C and E, each at their own resolution based on the spatial relationship with user graphical representations B, C and E, and sends his or her own corresponding multimedia stream D.

Client device E, because the user graphical representation E is as close to user graphical representation A as user graphical representation B but may be looking in a direction different that user graphical representation A, receives the second highest resolution, receives the remaining multimedia streams B-D, each at their own resolution based on the spatial relationship with user graphical representations B-D, and sends his or her own corresponding multimedia stream E. However, depending on the configuration of SAMS 402, the client device E may also receive the same resolution as that of client device B, even though the user graphical representation E is looking slightly away from the user graphical representation A. This is because even though user graphical representation E may not be looking directly at user graphical representation A, user graphical representation E might suddenly turn his or her perspective within the virtual world 404 to look toward user graphical representation A, and in the absence of a multimedia stream from user graphical representation A, or if the multimedia stream from the user graphical representation A is at a low resolution despite the close distance between each other, then the quality of experience of the corresponding client device E may be disturbing or non-optimal. Thus, in this embodiment, it may be more efficient to consider the same resolution of that received by the client device B.

As may be appreciated from the description, the multimedia streams received by each user graphical representation 402 from the remaining four user graphical representations 402 are also individually managed and optimized for the corresponding user graphical representation spatial, three dimensional orientation, distance and priority relationship to the multimedia streams of the other user graphical representations. Thus, each of the client devices 408 receives an individual multimedia stream from the remaining four client devices if the multimedia streams are relevant for the corresponding client device 408.

In some embodiments, if a user graphical representation 402 is located too far away from the multimedia source, such as in the illustration of FIG. 4A, from user A, the user graphical representation 402 may be spared by the SAMS 406 from receiving the multimedia streams from the multimedia source. This may apply, for example, to user graphical representation D if the SAMS 406 is accordingly configured.

In some embodiments, the multimedia streams may not come from other user graphical representations, but rather from other multimedia sources, such as virtual animations, augmented reality virtual objects, pre-recorded or live videos from events or places, application graphical representations, video games, etc. In these embodiments, multimedia streams are still adaptable and may, e.g., be individually managed and optimized for the corresponding user graphical representation spatial, three dimensional orientation, distance and priority relationship to the multimedia streams of the received multimedia stream source. In other embodiments, the multimedia streams come from a combination of the user graphical representations and other multimedia sources.

Figure 5A:
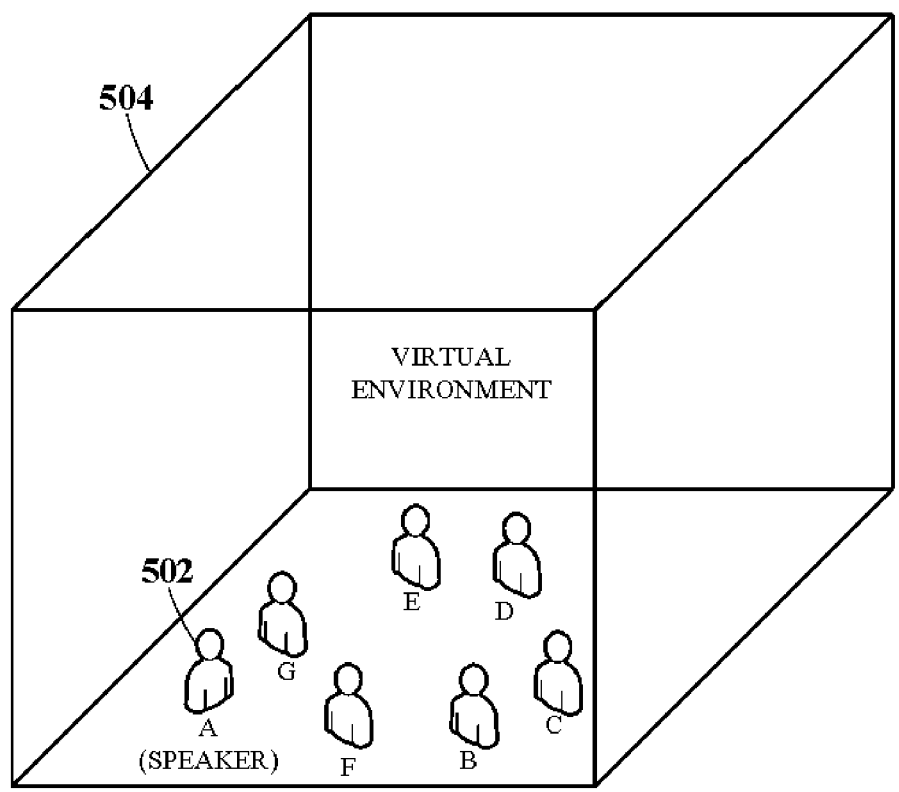
FIGS. 5A-5B show a schematic representation of a usage scenario where a SAMS combines media streams of a plurality of client devices, according to an embodiment.
Figure 5B:
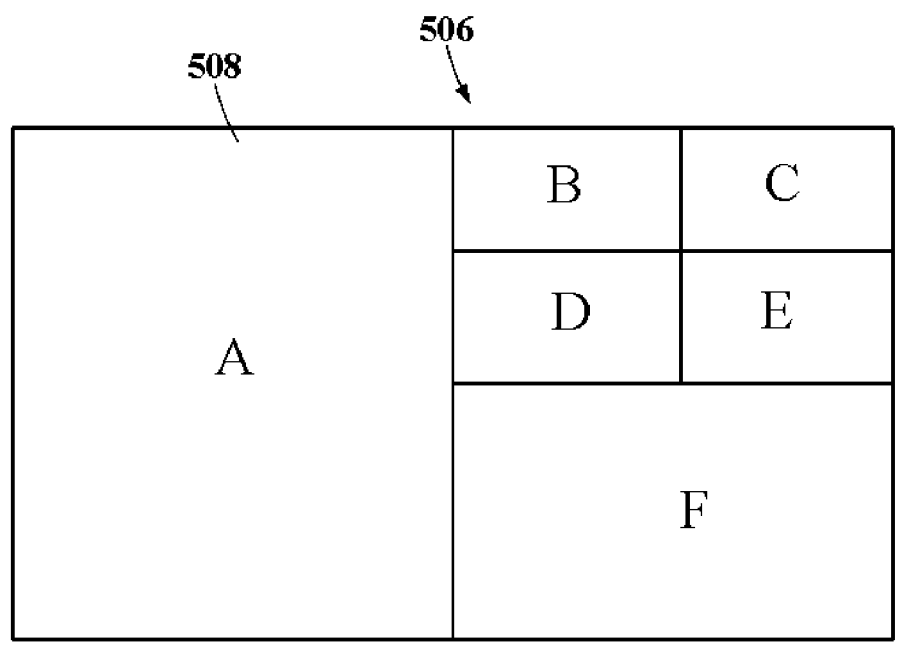

FIGS. 5A-5B show a schematic representation where SAMS combines media streams of a plurality of client devices, according to an embodiment. In an embodiment where SAMS may be configured to combine the media streams of the plurality of client devices, SAMS may combine the streams in the form of a mosaic. The mosaic may be a virtual frame comprising separate virtual tiles where the individual multimedia streams of user graphical representations are streamed. The mosaic may be adjusted per client device depending on the client device's user graphical representation distance relationships with the multimedia streams source and the remaining user graphical representations.

In FIG. 5A, seven user graphical representations 502 are interacting within a virtual environment 504, wherein user graphical representation A is a speaker, and the remaining user graphical representations B-G are listening to user graphical representation A. User graphical representations G and F are found relatively close to the user graphical representation A; user graphical representations E and F may be located relatively farther away from the user graphical representation A; and user graphical representations D and C may be located the farthest away from the user graphical representation A.

FIG. 5B depicts a combined multimedia stream in the form of a mosaic 506 comprising separate virtual tiles 508, virtual tiles A-F, streaming each of the individual multimedia streams from the corresponding user graphical representations 502 in the virtual environment 504 from the perspective of user graphical representation G. From the perspective of the user graphical representation G, virtual tile A may be the larger one, provided at the highest resolution, because user graphical representation A has a higher priority for its outbound media streams because of being a speaker; virtual tile F may be the second largest one, provided at the second highest resolution, because user graphical representation G is also very close to user graphical representation F; and user graphical representations B-E may be equally small and may have the same or a similar relatively low resolution amongst each other. In some embodiments, the SAMS 406 may send the same mosaic 506 to all client devices, and the client devices may proceed by cutting out the unnecessary tiles that may not be relevant to their position and orientation in the virtual environment.

Figure 6:
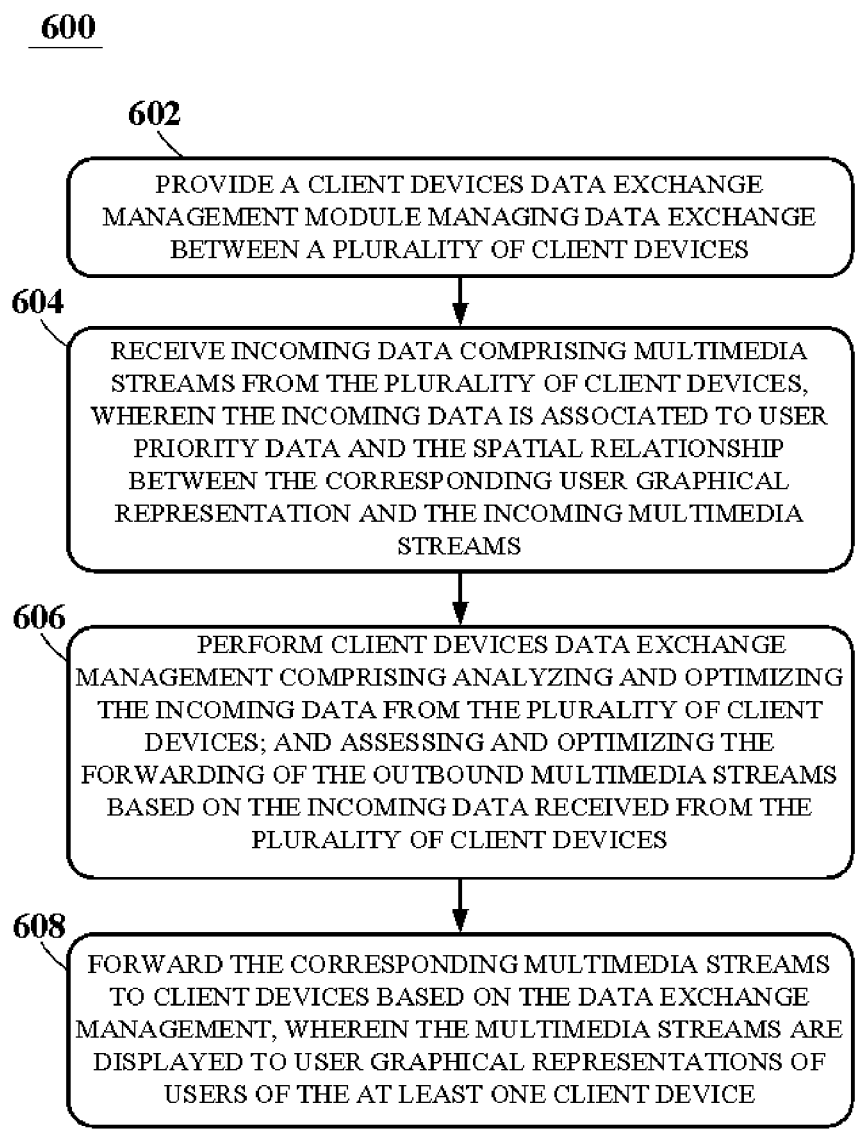
FIG. 6 depicts a block diagram of a spatially-aware multimedia router method of the current disclosure, according to an embodiment.

FIG. 6 depicts a block diagram of a spatially-aware multimedia router method 600 topology of the current disclosure, according to an embodiment. Method 600 may be implemented in a system such as disclosed with reference to systems 200 and 300 of FIGS. 2-3.

Method 600 begins in step 602 by providing, in memory of at least one media server computer data and instructions implementing a client devices data exchange management module managing data exchange between a plurality of client devices.

Then, in step 604, the method 600 proceeds by receiving, by at least one media server computer, incoming data comprising at least multimedia streams from the plurality of client devices. Said incoming data is associated with user priority data and the spatial relationship between the corresponding user graphical representation and the incoming multimedia streams.

In step 606, the method 600 proceeds by performing, by the data exchange management module, client devices data exchange management. The data exchange management may comprise analyzing and processing the incoming data from the plurality of client devices including graphical elements from within the virtual environment; and assessing and optimizing the forwarding of the outbound multimedia streams based on the incoming data received from the plurality of client devices.

Finally, in step 608, method 600 may proceed by forwarding the corresponding multimedia streams to client devices based on the data exchange management, wherein the multimedia streams are displayed to user graphical representations of users of the at least one client device.

In some embodiments, the method 600 further comprises, when forwarding the outbound multimedia streams, utilizing a routing topology, or a media processing topology, or a forwarding server topology, or other suitable multimedia server routing topologies, or a media processing and forwarding server topology, or other suitable server topologies.

In further embodiments, as a routing topology, the at least one media server computer uses a selective forwarding unit (SFU) topology, a Traversal Using Relay NAT (TURN) a spatially analyzed media server topology (SAMS), or a multimedia server routing topology.

In further embodiments, as a media processing topology, the at least one media server computer is configured to perform one or more operations on the incoming data comprising compressing, encrypting, re-encrypting, decrypting, decoding, combining, improving, mixing, enhancing, augmenting, computing, manipulating, encoding, or a combination thereof.

In further embodiments, when utilizing a forwarding server topology, the method 600 further comprises utilizing one or more of MCUs, cloud media mixers, and cloud 3D renderers.

In some embodiments, as a SAMS, the at least one media server computer is configured to analyze and process the incoming data of each client device related to user priority and the distance relationship between the corresponding user graphical representation and multimedia streams. The incoming data comprises one or more of meta-data, priority data, data classes, spatial structure data, three-dimensional positional, orientation or locomotion information, speaker or listener status data, availability status data, image, media, and scalable video codec-based video, or a combination thereof. In some embodiments, optimizing the forwarding of the outbound multimedia streams implemented by the at least one media server computer implementing the SAMS comprises optimizing bandwidth and computing resource utilization for the one or more receiving client devices.

In some embodiments, the SAMS optimizes the forwarding of the outbound data streams to each receiving client device by modifying, upscaling or downscaling the media for temporal features, spatial features, quality, and color features.

Computer-readable media having stored thereon instructions configured to cause one or more computers to perform any of the methods described herein are also described. As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A multimedia router system comprising:
at least one media server computer comprising at least one processor and memory, wherein the at least one media server computer is configured to receive and analyze incoming data comprising incoming multimedia streams from client devices, and adapt outbound multimedia streams for individual client devices based on the incoming data received from the client devices, wherein the incoming multimedia streams include elements from within at least one virtual environment, wherein the outbound multimedia streams are adapted for the individual client devices based on user priority data and spatial orientation data that describes spatial relationships between corresponding user graphical representations and sources of the incoming multimedia streams within the at least one virtual environment, and wherein the spatial orientation data on which the adapting of the outbound multimedia streams is based includes the degree to which the corresponding user graphical representations are facing the sources of the incoming media streams.

2. The system of claim 1, wherein the at least one virtual environment is hosted on at least one dedicated server computer connected via a network to the at least one media server computer, or is hosted in a peer-to-peer infrastructure and is relayed through the at least one media server computer.

3. The system of claim 1, wherein the at least one virtual environment comprises a virtual replica of a real-world location, and wherein the real-world location comprises a plurality of sensors providing further data to the virtual replica of the real-world location.

4. The system of claim 1, wherein the at least one media server computer uses a selective forwarding unit (SFU) topology, or a Traversal Using Relay NAT (TURN) topology, or a spatially analyzed media server topology (SAMS).

5. The system of claim 1, wherein the at least one media server computer is further configured to combine the incoming data in the form of a mosaic comprising separate tiles where the individual multimedia streams of user graphical representations are streamed.

6. The system of claim 1, wherein the at least one media server computer is configured as a multipoint control unit (MCU), or a cloud media mixer, or a cloud 3D renderer.

7. The system of claim 1, wherein adapting the outbound multimedia streams comprises optimizing bandwidth and computing resource utilization for the one or more receiving client devices.

8. The system of claim 1, wherein adapting the outbound multimedia streams comprises adapting temporal features, spatial features, quality, or color features, or a combination thereof.

9. The system of claim 1, wherein the user priority data on which the adapting of the outbound multimedia streams is based includes an indication of whether the corresponding user graphical representations are associated with speakers or listeners.

10. The system of claim 1, wherein the spatial orientation data on which the adapting of the outbound multimedia streams is based further includes distances between the corresponding user graphical representations and the sources of the incoming media streams within the at least one virtual environment.

11. A multimedia routing method comprising:
receiving, by at least one media server computer, incoming data comprising incoming multimedia streams from a plurality of client devices, wherein the incoming data is associated with user priority data and spatial orientation data that describes spatial relationships between corresponding user graphical representations and sources of the incoming multimedia streams within a virtual environment;
analyzing the incoming data from the plurality of client devices including graphical elements from within the virtual environment;
adapting outbound multimedia streams based on the incoming data received from the plurality of client devices and the spatial orientation data, wherein the spatial orientation data on which the adapting of the outbound multimedia streams is based includes the degree to which the corresponding user graphical representations are facing the sources of the incoming media streams; and
forwarding the adapted outbound multimedia streams to one or more receiving client devices, wherein the adapted outbound multimedia streams are configured to be displayed to users of the one or more receiving client devices.

12. The method of claim 11, wherein the at least one media server computer uses a selective forwarding unit (SFU) topology, a Traversal Using Relay NAT (TURN) topology, or a spatially analyzed media server topology (SAMS).

13. The method of claim 11, further comprising utilizing one or more of a Multipoint Control Unit (MCU), a cloud media mixer, or a cloud 3D renderer.

14. The method of claim 11 further comprising combining the incoming data in the form of a mosaic comprising separate tiles where the individual multimedia streams of user graphical representations are streamed.

15. The method of claim 11, wherein adapting the outbound multimedia streams comprises optimizing bandwidth and computing resource utilization for the one or more receiving client devices.

16. The method of claim 11, wherein adapting the outbound multimedia streams comprises adapting temporal features, spatial features, quality, or color features, or a combination thereof.

17. The method of claim 11, wherein the adapting of the outbound multimedia streams is further based on the user priority data, and wherein the user priority data on which the adapting of the outbound multimedia streams is based includes an indication of whether the corresponding user graphical representations are associated with speakers or listeners.

18. The method of claim 11, wherein the spatial orientation data on which the adapting of the outbound multimedia streams is based further includes distances between the corresponding user graphical representations and the sources of the incoming media streams within the virtual environment.

19. A non-transitory computer readable medium having stored thereon instructions configured to cause at least one media server computer comprising a processor and memory to perform steps comprising:
receiving, by at least one media server computer, incoming data comprising incoming multimedia streams from a plurality of client devices, wherein the incoming data is associated with spatial orientation data that describes spatial relationships between one or more user graphical representations and at least one element of at least one virtual environment;
analyzing the incoming data from the plurality of client devices;
adapting outbound multimedia streams based on the incoming data received from the plurality of client devices and the spatial orientation data, wherein the spatial orientation data on which the adapting of the outbound multimedia streams is based include the degree to which the corresponding user graphical representations are facing the at least one element of the at least one virtual environment; and
forwarding the adapted outbound multimedia streams to receiving client devices, wherein the adapted outbound multimedia streams are configured to be displayed at the receiving client devices.

20. The non-transitory computer readable medium of claim 19, the steps further comprising determining user priority and the spatial relationships based on the incoming data.

21. The non-transitory computer readable medium of claim 19, wherein adapting the outbound multimedia streams comprises optimizing bandwidth and computing resource utilization for the one or more receiving client devices.

22. The non-transitory computer readable medium of claim 19, wherein adapting the outbound multimedia streams comprises adapting temporal features, spatial features, quality, or color features, or a combination thereof.

23. The non-transitory computer readable medium of claim 19, wherein the spatial relationships on which the adapting of the outbound multimedia streams is based further include distances between the corresponding user graphical representations and the at least one element of the at least one virtual environment.

* * * * *